(12) United States Patent
Shah

(10) Patent No.: US 11,082,831 B2
(45) Date of Patent: Aug. 3, 2021

(54) TARGETED OVER-THE-AIR UPDATES

(71) Applicant: T-Mobile USA, Inc., Bellevue, WA (US)

(72) Inventor: Mehul Shah, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/443,199

(22) Filed: Jun. 17, 2019

(65) Prior Publication Data
US 2020/0396589 A1    Dec. 17, 2020

(51) Int. Cl.
| | |
|---|---|
| *H04W 8/18* | (2009.01) |
| *H04W 76/11* | (2018.01) |
| *H04W 88/02* | (2009.01) |
| *H04W 8/12* | (2009.01) |
| *H04L 29/12* | (2006.01) |

(52) U.S. Cl.
CPC ......... *H04W 8/183* (2013.01); *H04L 61/3075* (2013.01); *H04L 61/6054* (2013.01); *H04W 8/12* (2013.01); *H04W 76/11* (2018.02); *H04W 88/023* (2013.01)

(58) Field of Classification Search
CPC ....... H04W 8/183; H04W 76/11; H04W 8/12; H04W 88/023; H04L 61/3075; H04L 61/6054
See application file for complete search history.

(56) References Cited

U.S. PATENT DOCUMENTS

| | | | |
|---|---|---|---|
| 2002/0107011 A1* | 8/2002 | Mazzarella | H04M 3/42 |
| 2005/0075106 A1 | 4/2005 | Jiang | |
| 2006/0087982 A1* | 4/2006 | Kuure | H04L 1/00 |
| 2012/0040700 A1* | 2/2012 | Gomes | H04B 7/00 |
| 2015/0304836 A1* | 10/2015 | Anslot | H04W 8/06 |
| 2015/0373778 A1* | 12/2015 | Holtmanns | H04W 88/06 |
| 2018/0376358 A1* | 12/2018 | Uppili | H04W 24/04 |

FOREIGN PATENT DOCUMENTS

| | | |
|---|---|---|
| CN | 106937283 A | 7/2017 |
| EP | 2759154 A1 | 7/2014 |

OTHER PUBLICATIONS

The Extended European Search Report dated Jul. 22, 2020 for European Patent Application No. 20177504.6, 14 pages.
Monaco Telematiqure, "The OTA & Mobile Device Management Whitepaper", Apr. 2006, Retrieved from teh internet: URL:http://www.mctel.net/pdf/white-paper-dmc-en.pdf , pp. 6-21.

* cited by examiner

*Primary Examiner* — Ronald B Abelson
(74) *Attorney, Agent, or Firm* — Lee & Hayes, P.C.

(57) ABSTRACT

Techniques for configuring data in a subscriber identity module (SIM) of a user equipment (UE) via over-the-air (OTA) configuration messages are discussed herein. An OTA server may receive, from an operator associated with a telecommunication network, identifying information specifying a UE or a group of UEs in which to send the OTA configuration and may receive an indication of a type of configuration to be included in the OTA configuration. The OTA server may access an equipment identity register (EIR) to determine which UEs to receive the OTA configuration message based on the identifying information.

17 Claims, 7 Drawing Sheets

600 ⟶

```
┌─────────────────────────────────────────────────────────────┐
│ RECEIVE AT LEAST A TYPE ALLOCATION CODE (TAC), AN INTERNATIONAL MOBILE │
│ SUBSCRIBER (IMSI) RANGE, A TYPE OF OVER THE AIR (OTA) MESSAGE, AND AN OTA │
│                   CONFIGURATION REFERENCE                    │
│                             602                              │
└─────────────────────────────────────────────────────────────┘
                              ↓
┌─────────────────────────────────────────────────────────────┐
│ GENERATE, BASED AT LEAST IN PART ON THE TYPE OF OTA MESSAGE AND THE OTA │
│         CONFIGURATION REFERENCE, AN OTA CONFIGURATION MESSAGE          │
│                             604                              │
└─────────────────────────────────────────────────────────────┘
                              ↓
┌─────────────────────────────────────────────────────────────┐
│ DETERMINE, VIA ACCESSING AN EQUIPMENT IDENTITY REGISTER (EIR) AND BASED AT LEAST │
│ IN PART ON THE TAC AND THE IMSI RANGE, AT LEAST ONE USER EQUIPMENT (UE) TO │
│              RECEIVE THE OTA CONFIGURATION MESSAGE           │
│                             606                              │
└─────────────────────────────────────────────────────────────┘
                              ↓
┌─────────────────────────────────────────────────────────────┐
│     SEND, TO THE AT LEAST ONE UE, THE OTA CONFIGURATION MESSAGE       │
│                             608                              │
└─────────────────────────────────────────────────────────────┘
```

> RECEIVE AT LEAST FIRST IDENTIFYING INFORMATION ASSOCIATED WITH AT LEAST ONE USER EQUIPMENT (UE), SECOND IDENTIFYING INFORMATION ASSOCIATED WITH THE AT LEAST ONE UE, A FIRST TYPE OF OVER THE AIR (OTA) MESSAGE, A SECOND TYPE OF OVER THE AIR (OTA) MESSAGE, A FIRST OTA CONFIGURATION REFERENCE, AND A SECOND OTA CONFIGURATION REFERENCE
> 702

> GENERATE, BASED AT LEAST IN PART ON THE FIRST TYPE OF OTA MESSAGE AND THE FIRST OTA CONFIGURATION REFERENCE, A FIRST OTA CONFIGURATION MESSAGE
> 704

> GENERATE, BASED AT LEAST IN PART ON THE SECOND TYPE OF OTA MESSAGE AND THE SECOND OTA CONFIGURATION REFERENCE, A SECOND OTA CONFIGURATION MESSAGE
> 706

> DETERMINE, VIA ACCESSING AN EQUIPMENT IDENTITY REGISTER (EIR) AND BASED AT LEAST IN PART ON THE FIRST IDENTIFYING INFORMATION AND THE SECOND IDENTIFYING INFORMATION A FIRST SIM ASSOCIATED WITH THE AT LEAST ONE UE TO RECEIVE THE FIRST OTA CONFIGURATION MESSAGE AND A SECOND SIM ASSOCIATED WITH THE AT LEAST ONE UE TO RECEIVE THE SECOND OTA CONFIGURATION MESSAGE
> 708

> SEND THE FIRST OTA CONFIGURATION MESSAGE TO THE FIRST SIM AND THE SECOND OTA CONFIGURATION MESSAGE TO THE SECOND SIM
> 710

FIG. 7

TARGETED OVER-THE-AIR UPDATES

BACKGROUND

Smart phones and other cellular devices, referred to as user equipment (UE), are ubiquitous. These UE may be equipped with subscriber identity modules (SIMs or SIM cards) or electronic SIMS (eSIMs), which may store various data and applications, such as international mobile subscriber identity (IMSI), network and/or carrier specific information such as preferred mobile network codes (MNCs), and the like. Additionally, each UE may be of a different type (e.g., pre-paid or post-paid) or may use a different operating system (OS) (e.g., iOS or Android). Mobile network operators (MNOs) of these UEs often require updating the applications and data in the SIM cards of the UEs, which are performed over-the-air (OTA).

In existing solutions, OTA updates are sent to large user-bases, such as all UEs using a same OS or all UEs that have downloaded an application. Sending such broad-ranging OTAs can limit the types of OTAs that can be sent out and can result results in security risks and errors in updates.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 illustrates an example process for generating an OTA configuration message and sending the OTA configuration message to a UE, in accordance with some examples of the present disclosure.

FIG. 7 illustrates an example process for generating an OTA configuration message and sending the OTA configuration message to a UE, in accordance with some examples of the present disclosure.

DETAILED DESCRIPTION

Figure 1:
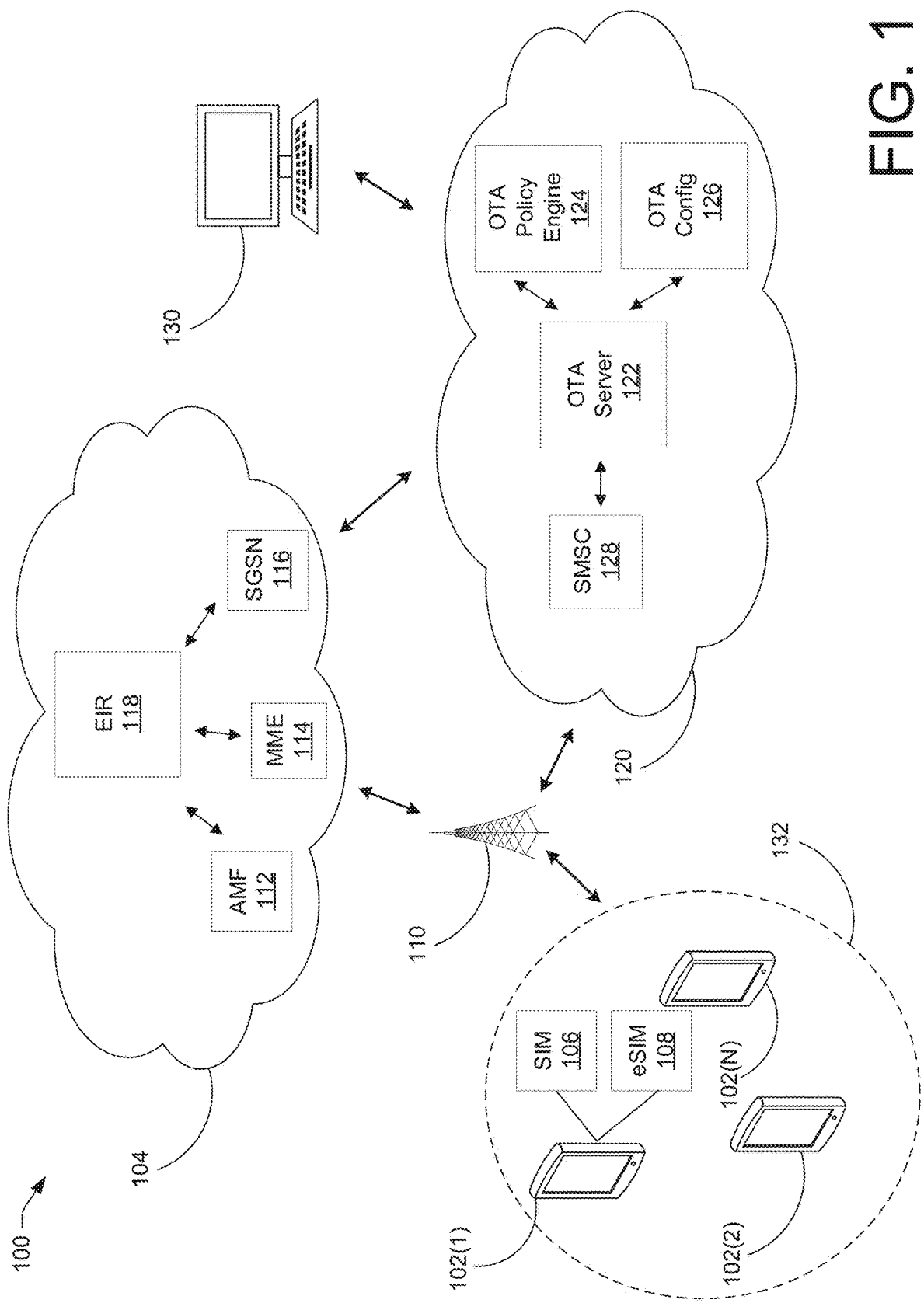
FIG. 1 illustrates an overview and example environment, including a system in which OTA configuration messages may be sent to UEs, in accordance with some examples of the present disclosure.

Aspects of this disclosure are directed to sending OTA updates (e.g., OTA configuration messages) to a specified UE or group of UEs using an OTA server. The OTA server may receive identifying information of the specified UE or group of UEs and accesses an equipment identifying register (EIR) to determine which UE(s) to receive the OTA update based on the identifying information.

The system described herein can be implemented in a wireless network including various UEs. One of skill in the art will recognize, however, that the system is equally applicable to other types of networks such as, for example, Wi-Fi, cable or satellite TV networks, or other networks with devices capable of receiving updates. In addition, the term UE used herein can include cellular and smart phones, tablet and laptop computers, games, USB data sticks, and other network enabled electronic equipment.

To this end, examples of the present disclosure can comprise systems and methods for sending OTA updates to a specified UE or group of UEs via an OTA server. The system can utilize identifying information of the UEs to provide granularity when specifying a UE or group of UEs that are determined to receive the OTA update. Being able to send an OTA update to a specified UE or group of UEs increases the level of security by which an OTA server operates (i.e., by introducing fewer potential compromised devices into a framework) and increases the types of OTA updates that may be sent out (i.e., sending specialized OTA updates to a certain group of compatible UEs).

In some examples, an OTA server may receive identifying information from an operator associated with a MNO that specifies a UE or a group of UEs. For example, the identifying information may be received from a computing device that presents a user interface to the operator enabling the operator to fill out multiple fields specifying the UE or the group of UEs in which the operator would like to send an OTA update. In some cases, the identifying information may include a type allocation code (TAC), an international mobile subscriber range (IMSI) range, a type of over the air (OTA) message (e.g., change in access point name (APN), change in mobile station international subscriber directory number (MSISDN) change in roaming settings, change in security settings etc.), and/or an OTA configuration reference (e.g., OTA-_CONFIG_FI_APN, OTA_CONFIG_ FI_VM, etc.). The OTA server may generate an OTA configuration message (e.g., an OTA update) based on the identifying information. For example, the OTA server may access an OTA Policy Engine and/or an OTA Configuration Server based on the type of OTA message information received and/or the OTA configuration reference information received. The OTA server may determine a UE or a group of UEs in which to send the configuration information based on the identifying information. For example, the identifying information may include a TAC and an IMSI range which specifies the UE or the group of UEs.

In some examples, the OTA server may access an Equipment Identity Register (EIR) in order to determine which UE or group of UEs to receive the OTA configuration message by selecting the UE or the group of UEs using the IMSI range or the TAC compared to the UE data stored in the EIR. The EIR may receive UE data from various mobility management nodes (e.g., an Access Management Function (AMF), a Mobility Management Entity (MME), a Serving GPRS Support Node (SGSN), etc.) in a telecommunication network that are in communication with UEs. Once the UE or the group of UEs are determined and the OTA configuration message is generated, the OTA server may send the OTA configuration message to the UE or the group of UEs. In some examples, the OTA server may send the OTA configuration message to the UE or the group of UEs via a short message service center (SMSC).

In some examples, the OTA server may be configured to send multiple different OTA configuration messages to multiple different SIMs (e.g., a physical SIM and an eSIM) that are associated with the same UE. For example, the different SIMs that are associated with the UE may each include a unique international mobile equipment identity (IMEI).

When the OTA server receives the identifying information used to specify which UE or group of UEs to send the OTA configuration message, the OTA server may also receive IMEI information specifying specific SIMs in which to send the OTA configuration message.

The methods, devices, and computer readable media described herein may be implemented in a number of ways. Example implementations are provided below with reference to the following figures.

FIG. 1 illustrates an overview and example environment 100, including UEs 102 communicating with a telecommunication network 104. Each UE 102 may be associated with a SIM or multiple SIMs, such as SIM 106 or eSIM 108 that are associated with UE 102(1). The SIM 106 and/or eSIM 108 may include identifying information for a user and the UE 102, including, among other things, an integrated circuit card identifier (ICCID), international mobile subscriber identity (IMSI) number, and its related key. This information can be used to identify and authenticate the UE 102, the SIM 106, and the eSIM 108 on cellular voice and data networks, such as the telecommunication network 104.

As illustrated, UEs 102, such as UE 102(1), UE 102(2) and UE 102(N), can initiate communications with the telecommunication network 104 via a macrocell 110. The telecommunication network 104 in the depicted environment includes an AMF 112, a MME 114, a SGSN 116, and an EIR 118.

In various implementations, the UEs 102 may be any sort of computing device or computing devices, such as cellular phones, tablet computers, laptop computers, wearable computers, media players, personal computers (PCs), workstations, thumb drives, USB data sticks, or any other sort of device or devices. Each UE 102(1), 102(2), and 102(N) may be different of a different type. UE 102(1) may be a cellular phone (e.g., a smart phone), for example, UE 102(2) may be a tablet computer, and UE 102(N) may be a laptop computer. The UEs 102 may include one or more additional wireless communications ports. In an example, the wireless communications port may be compliant with any unlicensed wireless protocol such as Wi-Fi (e.g., 802.11-based technologies), WiMax, Bluetooth, infrared communications, or any other wireless protocol.

The UEs 102 may communicate with the telecommunication network 104 through macrocell 110. The communication channel between the UEs 102 and the macrocell 110 may comprise at least a cellular voice channel and a cellular data channel. In an example, the UEs 102 may communicate with the telecommunication network 104 via a small cell. In an example, the macrocell 110 may be replaced with a microcell, a picocell, or a femtocell. In an example, the UEs 102 may communicate with the telecommunication network 104 via a macrocell, small cell, microcell, a picocell, a femtocell, and/or combinations thereof.

The macrocell 110 may include any node that provides radio access for UEs 102. One example macrocell 110 is a node in an evolved UMTS Terrestrial Radio Access Network (E-UTRAN) of an LTE system. The E-UTRAN includes an evolved NodeB (eNodeB or eNB). In one example, an eNB functions similarly to a base transceiver station in a GSM network. The E-UTRAN facilitates communication between the UEs 102 and the telecommunication network 104. In an example, an eNB is connected to the telecommunication network 104 and communicates directly with UEs 102. In some examples, the macrocell 110 may include a gNodeB of a Fifth Generation (5G) cellular network.

In an example, the telecommunication network 104 includes an EIR 118. The EIR 118 includes a database for storing information about the subscribers (e.g., UEs 102) of the mobile carrier. The EIR 118 may be queried using an International Mobile Subscriber Identity (IMSI) and/or International Mobile Equipment Identity (IMEI) as keys. In one example, the IMSI number may be stored in the SIM 106 and/or the eSIM 108 of the UEs 102. The telecommunication network 104 may be any sort of telecommunication network or networks associated with a telecommunication service provider. Such a telecommunication network 104 may include a core network and multiple access networks associated with multiple locations. The access networks may include cellular networks—utilizing Long Term Evolution (LTE), Global System for Mobility (GSM), 5G radio access technology, or other cellular technology—and other networks (e.g., Wi-Fi) utilizing unlicensed spectrum. The access networks can also include airborne Wi-Fi and cellular networks such as, for example, Gogo in-flight services.

The UE identity information may be obtained from various sources, including a SIM, UMTS Subscriber Identity Module (USIM), a CDMA Subscriber Identity Module (CSIM) or Re-Useable Identification Module (R-UIM), IP Multimedia Services Identity Module (ISIM), or from a database. The user equipment identity information may be stored in various databases, including the EIR 118.

In some examples, SIM information may be obtained from a universal integrated circuit card (UICC). In an example, the UICC includes a universal subscriber identity module (USIM). The UICC may also include an ISIM, SIM, USIM, CSIM, or R-UIM. The USIM may include a SIM number and an International Mobile Equipment Identity (IMEI). The SIM number provides contact information (such as the telephone number) of the UEs 102. In an example, the SIM number may be used as a key into a database (such as a EIR 118) to obtain the contact or telephone number of UEs 102. In an example, the SIM information may be stored in an IP Multimedia Services Identity Module (ISIM). The IMEI identifies or indicates the identity of the UEs 102. The IMEI may be stored (i) in the UEs 102, (ii) in a database operated by a mobile carrier associated with the user of the UEs 102, (iii) in database accessible by a mobile carrier, and/or (iv) in a third-party database. The IMEI may be stored in the one or multiple databases.

In some examples, the telecommunication network 104 may comprise of a core network which may support packet-switched or circuit-switched connections and may include a number of network components. Such components may include a home location register (HLR) or HSS for storing user and device information, as well as IMS components, such as the P-CSCF and S-CSCF. The components may also include an application server(s), such as a telephony application server (TAS) or rich communication service (RCS) server. Further, the telecommunication network 104 may include an account information server (AIS), which may provide network identities, contact addresses, credentials, and other information to the UEs 102.

In addition, the telecommunication network 104 devices may be implemented on a single computing device. Such computing devices may each be or include a server or server farm, multiple, distributed server farms, a mainframe, a work station, a PC, a laptop computer, a tablet computer, an embedded system, or any other sort of device or devices. In one implementation, the computing device(s) represent a plurality of computing devices working in communication, such as a cloud-computing network of nodes.

The environment 100 can also include an OTA platform 120 including an OTA server 122, an OTA policy engine 124, an OTA configuration server 126, and an SMSC 128. The OTA platform 120 can provide initial, or updated configurations to the UEs 102 and/or the SIM 106 and eSIM 108 via the OTA server 122. For example, the OTA policy engine 124 may interface with a computing device 130 in order to receive identifying information for specifying the UEs 102 and the types of OTA updates that will be sent to the UEs 102. The OTA server 122 may receive the identifying information from the OTA policy engine 124 and access the OTA configuration server 126 to retrieve the configurations. The OTA configuration server 126 may store a number of configurations (e.g., OTA_CONFIG_FI_APN, OTA-CONFIG_FI_VM, OTA_CONFIG_WEL_ROAM, OTA-CONFIG_WEL_ROAM_APN, etc.) that may be retrieved by the OTA server 122 and sent to the UEs 102 via an OTA configuration message.

In some examples, the OTA platform 120 can be a "back-end" entity (or network entity) that receives notifications from other network systems, such as the telecommunication network 104. In other examples, the OTA platform 120 may be part of the telecommunication network 104.

In some examples, the UEs 102 may connect to the telecommunication network 104 via the macrocell 110 and may be authenticated by the AMF 112, MME 114, and/or the SGSN 116. The AMF 112, MME 114, and/or the SGSN 116 may communicate with the EIR 118 and provide the EIR 118 with identifying information associated with the UEs 102, such as TACs, IMSIs, IMEIs, and the like. The EIR 118 may store the identifying information associated with the UEs. The EIR 118 may receive the identifying information from the AMF 112, MME 114, and/or the SGSN 116 via 3GPP standard interfaces (e.g., S13, S13', N17, etc.).

The OTA server 122 may receive identifying information from an operator accessing a computing device 130 associated with a MNO that specifies the UE 102 or a group of UEs 132. For example, the computing device 130 may be associated with a mobile network operator (MNO) of the telecommunication network 104 and the computing device 130 may present an interface to an operator associated with the MNO that enables the user to fill out multiple fields specifying the UEs 102 in which the operator would like to send an OTA update.

In some cases, the identifying information may include a type allocation code (TAC), an international mobile subscriber range (IMSI) range, a type of over the air (OTA) message (e.g., change in access point name (APN), change in mobile station international subscriber directory number (MSISDN) change in roaming settings, change in security settings etc.), and/or an OTA configuration reference (e.g., OTA-_CONFIG_FI_APN, OTA_CONFIG_FI_VM, etc.). The OTA server 122 may generate an OTA configuration message (e.g., OTA update) based on the identifying information. For example, the computing device 130 may access the OTA policy engine 124 and provide the identifying information specifying the UEs 102, the type of OTA message, and the OTA configuration information. The OTA server 122 may receive a transmission from the OTA policy engine 124 indicating that an OTA update has been requested and the OTA policy engine 124 may provide the identifying information specifying the UEs 102, the type of OTA message, and the OTA configuration information to the OTA server 122. The OTA server 122 may then access the OTA Configuration Server 126 and request a configuration, based on the type of OTA message information received and/or the OTA configuration reference information received, that may be provided to the specified UEs 102 via an OTA configuration message.

The OTA server 122 may determine, based at least in part on the identifying information, the UEs 102 to receive the OTA configuration message. For example, the OTA server 122 may access the EIR 118 in order to determine the UEs 102 that satisfy the specified identifying information received from the computing device 130. In some examples, the OTA server 122 may access the EIR and/or the OTA Policy Engine 124 via an application programming interface (API). Once the UEs 102 are determined and the OTA configuration message is generated, the OTA server 122 may send the OTA configuration message to the UEs 102. In some examples, the OTA server 122 may send the OTA configuration message to the UEs via the SMSC 128.

In some examples, the OTA server 122 may be configured to send multiple different OTA configuration messages to multiple different SIMs (e.g., a physical SIM and an eSIM), such as SIM 106 and eSIM 108 that are associated with the same UE 102. For example, SIM 106 and eSIM 108 may both be associated with the UE 102 and may each include a unique IMEI. When the OTA server 122 receives the identifying information used to specify the UEs 102 to send the OTA configuration message, the OTA server 122 may also receive IMEI information specifying specific SIMs, such as SIM 106 and eSIM 108 in which to send the OTA configuration message. The OTA server 122 may also receive a different type of OTA message and OTA configuration reference for the SIM 106 then the eSIM 108. In this case, the OTA server 122 would access the OTA configuration server 126 to retrieve a configuration for the SIM 106 and a different configuration for the eSIM 108. The different configurations may then be sent to the SIM 106 an eSIM 108 in separate OTA configuration messages via the SMSC 128.

Figure 2:
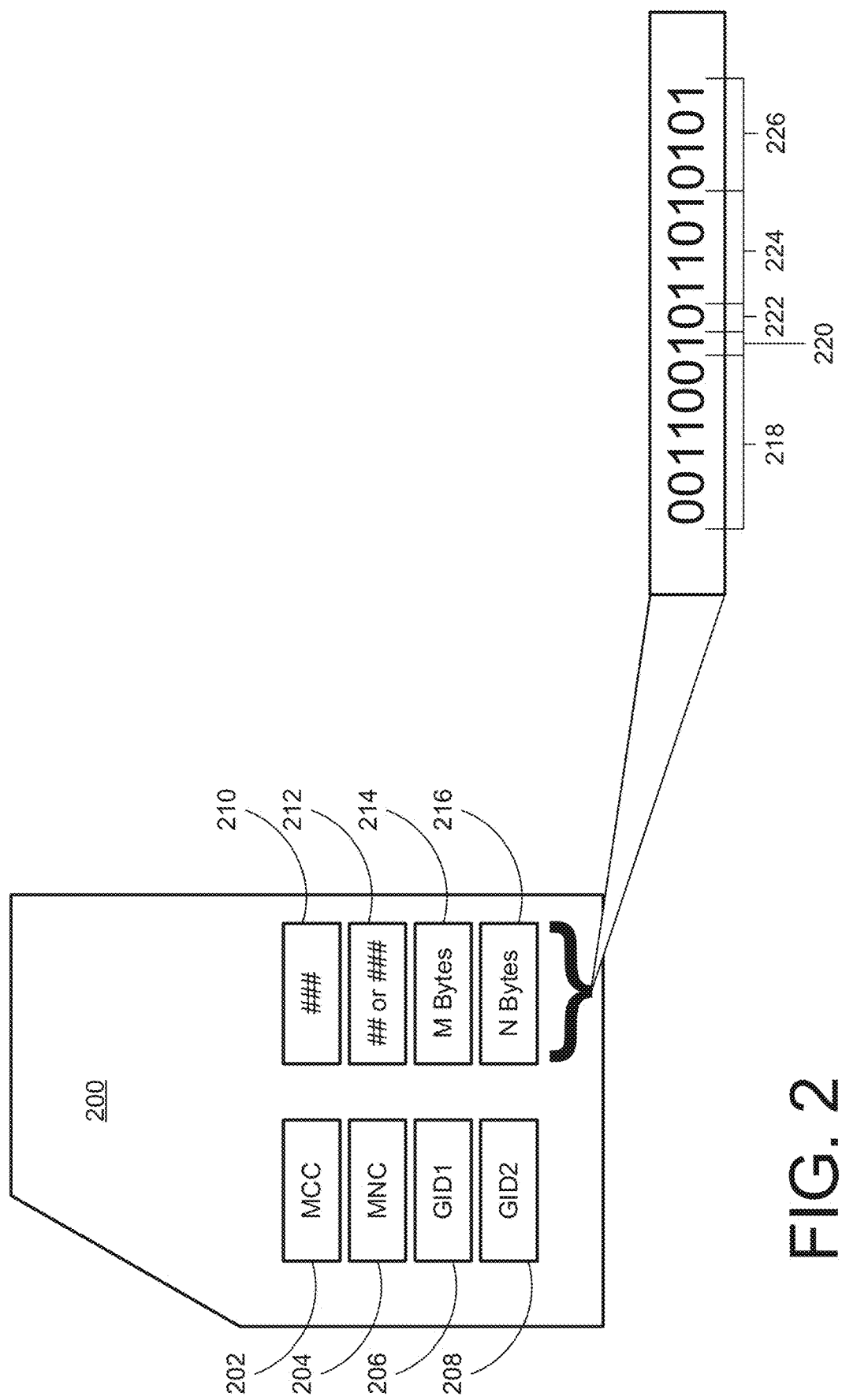
FIG. 2 depicts a subscriber identity module (SIM), in accordance with some examples of the present disclosure.

FIG. 2 illustrates an example SIM 200 that may represent SIM 106, eSIM 108, or any other SIM or eSIM that may be associated with the UEs 102. Most SIMs 200 currently use a mobile country code (MCC) 202 and mobile network code (MNC) 204 entries on the SIM 200. The MCC 202 is a three-decimal digit value 210 that, as the name implies, indicates the country of origin of the SIM 200 provider. Similarly, the MNC 204 is a two or three decimal digit value 212 that provides the name of the carrier, or network provider, associated with the SIM 200.

Many SIMs 200 nonetheless contain entries for group identifier 1 (GID1) 206 and group identifier 2 (GID2) 208. When they are used, they may be used to provide a single piece of information, generally using a 2-byte value 214, 216. In some examples, the GID1 and/or the GID2 may associate a particular SIM 200 to a particular brand of UE (e.g., Apple, Google, Samsung, etc.) within a network, for example. These entries MCC, 202, MNC 204, GID1 206, and GID2 208 can be used to provide additional granularity when specifying a group of UEs 102.

The subdivision of the bits for GID2 208, for example, can be based on the values 218, 220, 222, 224, 226. Value 218 can comprise six bits, for example, and can be used to denote a field that requires slightly more information. Value 218 could be used to denote a rate plan, for example, or a particular brand of UE. Value 220, on the other hand, can be used to denote a binary field. Value 220 could be "0" if the SIM 200 is for use with a prepaid plan (or UE), for example, and "1" if the SIM 200 is for use with a postpaid plan. Value 220 could also be used to denote a particular brand of UE, for example, where a carrier only has two brands. When specifying a SIM 200 in which to send an OTA configuration message, an operator of the computing device 130 may provide the OTA policy engine 124 with any one of the values 210-216 and the OTA server 122 may send the OTA configuration message to the UEs 102 that correlate to the values 210-216. Of course, the values 210-216 can include more or fewer fields or bits, depending on a particular implementation.

The SIM 200 may be programmed to contain one or more values 218-226 using the GID1 206 entry, GID2 208 entry, or both. In some examples, this additional programming can be hardcoded at the time the SIM 200 is manufactured. In other cases, the additional programming can be done when the SIM 200 is sold. In other words, a salesperson or technician at the phone retailer, for example, can add the necessary information to the SIM 200 using a SIM card writer, or similar device.

Each of the values of GID1 206, GID2 208, and other SIM 200 entries can be used in this manner to provide exceptional granularity. Thus, the particular layout shown in FIG. 2 is entirely illustrative. The allocation of bits to each value 218-226 is, therefore, arbitrary and can be changed to suit different configuration.

Figure 3A:
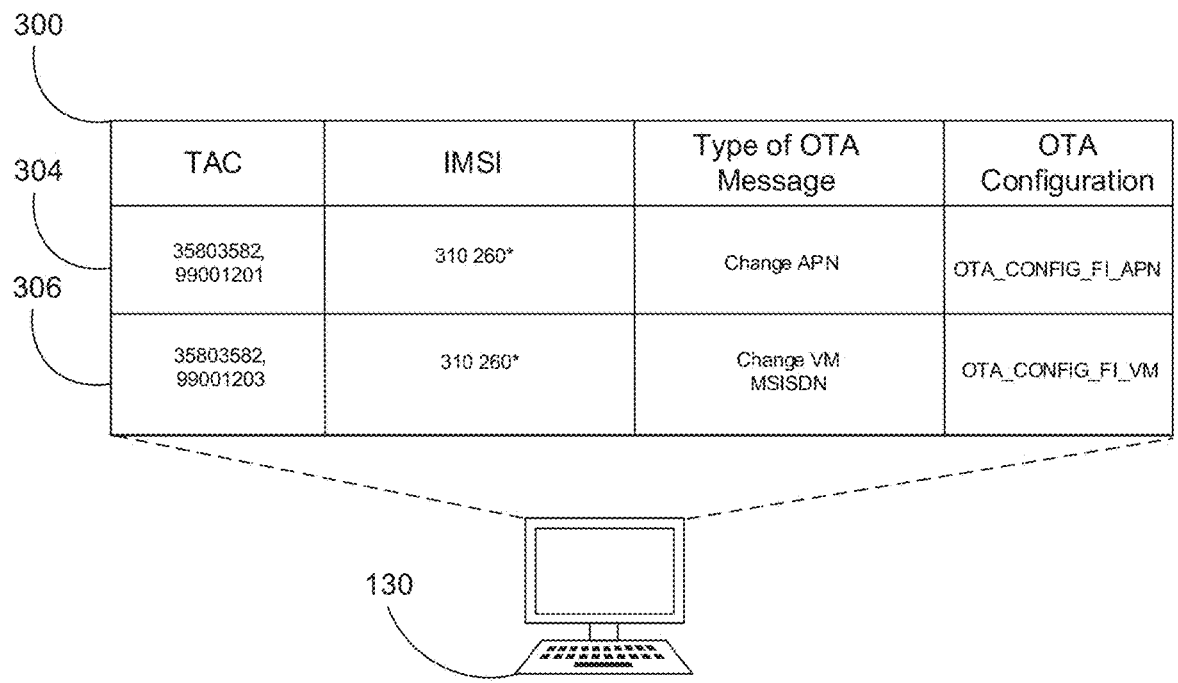
FIGS. 3A and 3B illustrate example user interfaces for use with the system, in accordance with some examples of the present disclosure.
Figure 3B:
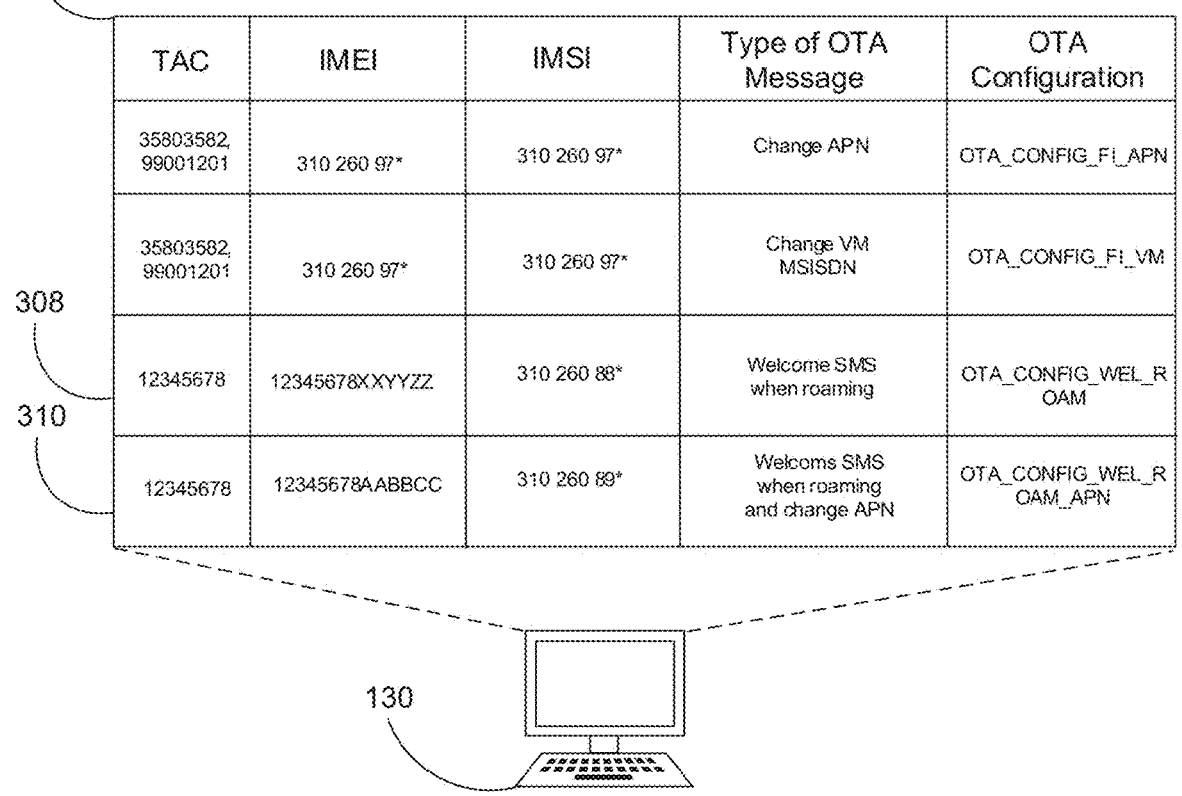

FIGS. 3A and 3B illustrate example user interfaces 300 and 302 that may be presented to an operator (e.g., via computing device 130) to allow the operator to specify UEs 102 in which to send an OTA configuration message. As shown in FIG. 3A, the user interface 300 may be formatted as a table and may provide a number of fields that the operator may input information used to identify the UEs 102. For example, the fields may include a type allocation code (TAC), an international mobile subscriber range (IMSI) range, a type of over the air (OTA) message (e.g., change in access point name (APN), change in mobile station international subscriber directory number (MSISDN) change in roaming settings, change in security settings etc.), and/or an OTA configuration reference (e.g., OTA_CONFIG_FI_APN, OTA-_CONFIG_FI_VM, etc.).

In some cases, the TAC may include an eight-digit portion of a fifteen-digit IMEI and sixteen-digit IMEISV code used to uniquely identify user equipment, such as the UEs 102. In some cases, the TAC may identity a particular manufacturer and model of user equipment. In some cases, the IMSI may include a fifteen-digit number where the first three digits represent the MCC followed by the MNC, which may be represented by either a two-digit number or a three-digit number. The remaining IMSI digits include the MSIN, which often includes a nine-digit number or ten-digit number representing a unique number that a wireless carrier uses to identify a specific user equipment.

By inputting a TAC and an IMSI, the user interface 300 may enable an operator to specify the UEs 102 based on device type (e.g., smartphone, USB data stick, etc.), operating system (e.g., iOS, Android, etc.), geographic region, network operator, and the like. The user interface 300 further enables an operator to determine a specific level of granularity by which the operator would like to use in sending out the OTA configuration message. For example, as illustrated in the user interface 300, the TAC field in row 304 of user interface 300 may include values "35803582" and "99001201," which may specify two different models of UEs having two different manufacturers. The IMSI field in row 304 of user interface 300 may include a value "310 260*," which may indicate that the operator is only specifying an MCC and an MNC value of the UEs that include TAC codes "35803582" and "99001201." For each of the TAC fields and IMSI fields of the user interface 300, more or fewer digits may be entered depending on the level of granularity that the operator wishes to specify. For example, if the operator wanted to send an OTA configuration message to a specific UE 102, then all of the digits of the IMSI field at row 304 or 306 may be filled out. Once identifying information of the UEs are inputted into the user interface 300, the operator may input a Type of OTA Message field which may specify the type of change that may be implemented on the UEs 102. For example, if the operator wishes to change an access-point-name (APN) of the UEs 102, then the operator may select "Change APN," as illustrated in row 304 of user interface 300.

In another example, if the operator wishes to change a VM MSISDN of the UEs 102, then the operator may select "Change VM MSISDN," as illustrated in row 304 of user interface 300. The operator may then include the OTA Configuration Reference associated with the Type of OTA message. For example, if the operator wishes to change an access-point-name (APN) of the UEs 102, then the operator may select "OTA_CONFIG_FI_APN," as illustrated in row 304 of user interface 300. In another example, if the operator wishes to change a VM MSISDN of the UEs 102, then the operator may select "OTA_CONFIG_FI_VM," as illustrated in row 304 of user interface 300.

In some cases, the computing device 130 may present a user interface 302 that may be presented to an operator to allow the operator to specify UEs 102 in which to send an OTA configuration message. As with user interface 300, user interface 302 may be formatted as a table and may provide a number of fields that the operator may input information used to identify the UEs 102. For example, the fields may include a type allocation code (TAC), an international mobile subscriber range (IMSI) range, a type of over the air (OTA) message, and/or an OTA configuration reference. Additionally, a user interface may include a field for inputting an IMEI value.

In some examples, a UE 102 may include both a physical SIM (e.g., SIM 106) and an eSIM (e.g., eSIM 108), which means that both of the physical SIM and the eSIM share the same TAC because they are both associated with the same UE 102. The operator may wish to send a different OTA configuration message to each of the physical SIM and the eSIM. The user interface 302 may allow the operator to specify a different type of OTA message for each of the physical SIM and the eSIM by including a field for specifying the IMEI. As an example, if the operator wishes to change an SMS setting while roaming for a first SIM associated with the UE 102, then the operator may input an IMEI value of "12345678XXYYZZ," an IMSI value of "310 260 88*," select "Welcome SMS when roaming," and "OTA_CONFIG_WEL_ROAM," as illustrated in row 308 of user interface 302. Similarly, if the operator wishes to change an SMS setting while roaming and change an APN for a second SIM associated with the UE 102, then the operator may input an IMEI value of "12345678AABBCC," an IMSI value of "310 260 89*," select "Welcome SMS when roaming and change APN," and "OTA_CONFIG_WEL_ROAM_APN," as illustrated in row 310 of user interface 302. Even though both of the TAC fields for rows 308 and 310 include the same value, different OTA configuration messages will be sent to the different SIMs associated with the respective IMEI and IMSI values.

It is understood that the identifying information for the UEs 102 in user interfaces 300 and 302 is not limited to TAC values, IMEI values, and IMSI values. Rather, any information that may specify a user equipment may be used to identify the UEs 102. For example, the identifying information may include a type of data plan, such as a pre-paid plan or a post-paid plan.

It is understood that the techniques described herein are not limited to a UI, and any input method may be used. In some examples, the UIs 300 and 302 can represent a data structure including information discussed herein.

Figure 4:
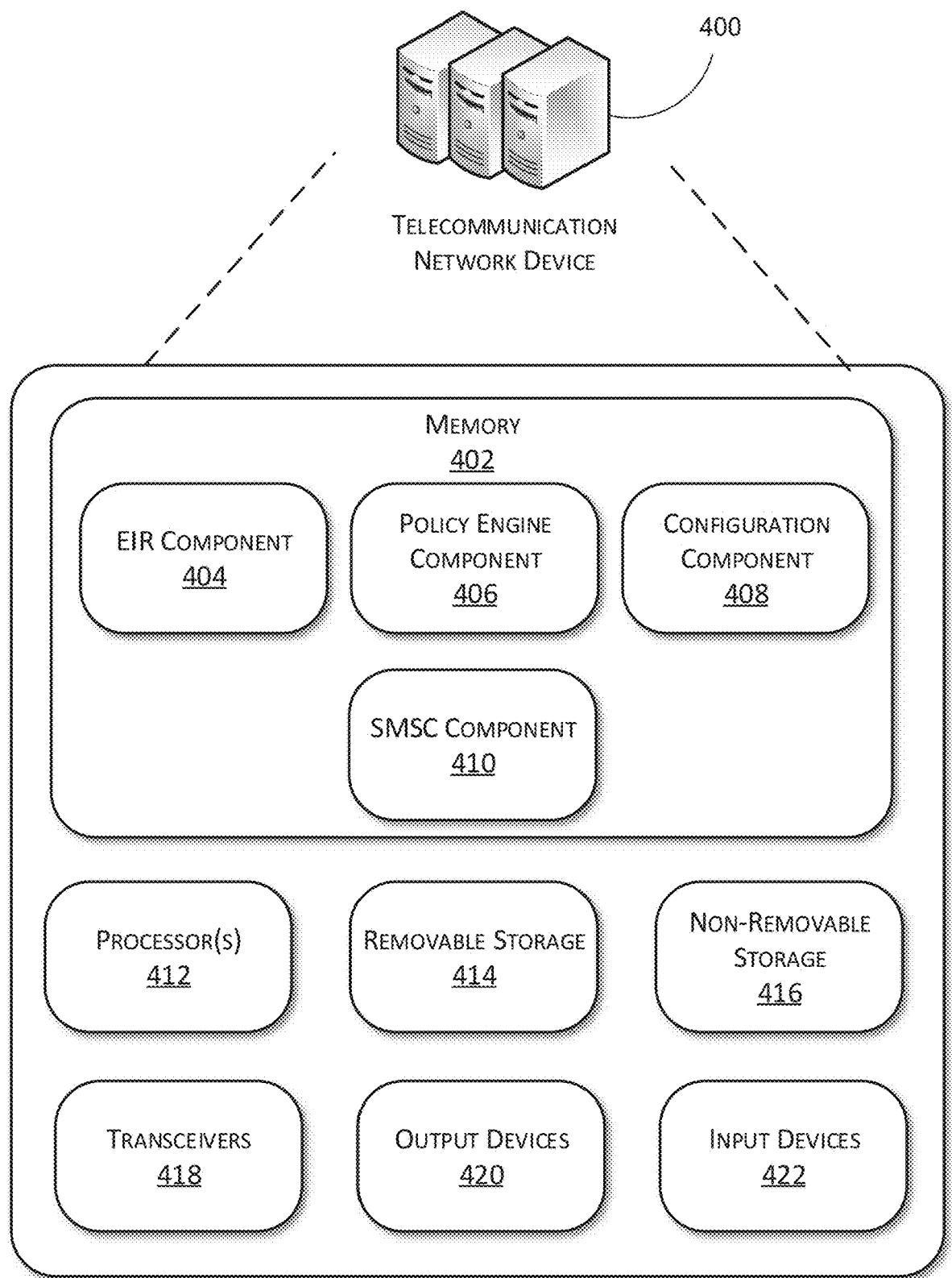
FIG. 4 illustrates a component level view of a telecommunication network device to provide configurations to UE(s), in accordance with some examples of the present disclosure.

FIG. 4 illustrates a component level view of a telecommunication network device configured to receive identifying information and OTA configuration information associated with UEs and to provide OTA configurations, among other things. The telecommunication network device 400 may be an example of the OTA server 122, the OTA policy engine 124, the OTA configuration server 126, another network device, or a combination thereof. As illustrated, the telecommunication network device 400 comprises a system memory 402 storing an EIR component 404, a policy engine component 406, a configuration component 408, and an SMSC component 410. Also, the telecommunication network device 400 can include a processor(s) 412, a removable storage 414, a non-removable storage 416, transceivers 418, output device(s) 420, and input device(s) 422.

In various implementations, system memory 402 is volatile (such as RAM), non-volatile (such as ROM, flash memory, etc.), or some combination of the two. The EIR component 404 may communicate with the EIR 118, including retrieving and storing identifying information associated with the UEs 102. The identifying information may include TACs, IMSIs, IMEIs, and the like.

The policy engine component 406 may communicate with the OTA policy engine 124 and determine that an OTA update has been requested and the OTA policy engine 124 may provide the identifying information specifying the UEs 102, the type of OTA message, and the OTA configuration information to the policy engine component 406, which may store the information. In some cases, the EIR component 404 may use the information received by the policy engine component 406 to access the EIR 118 and determine the contact information associate with the specified UEs 102.

The configuration component 408 may communicate with the OTA configuration server 126 and request a configuration, based on the type of OTA message information received and/or the OTA configuration reference information received. For example, the configuration component 408 may use the information received by the policy engine component 406 to query the OTA configuration server 126 and to retrieve any specified configurations.

The SMSC component 410 may communicate with the SMSC 128 to send the OTA configuration message to the UEs 102. For example, once the UEs 102 are determined via the EIR component 404 and the configurations are received via the configuration component 408, the telecommunication network device 400 may generate an OTA configuration message that is addressed to the UEs 102 and contains the configurations. The SMSC component 410 may then transmit the OTA configuration message via the SMSC 128.

In some implementations, the processor(s) 412 is a central processing unit (CPU), a graphics processing unit (GPU), or both CPU and GPU, or any other sort of processing unit. The telecommunication network device 400 may also include additional data storage devices (removable and/or non-removable) such as, for example, magnetic disks, optical disks, or tape. Such additional storage is illustrated in FIG. 4 by removable storage 414 and non-removable storage 416.

Non-transitory computer-readable media may include volatile and nonvolatile, removable and non-removable tangible, physical media implemented in technology for storage of information, such as computer readable instructions, data structures, program modules, or other data. System memory 402, removable storage 414, and non-removable storage 416 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the telecommunication network device 400. Any such non-transitory computer-readable media may be part of the telecommunication network device 400.

In some implementations, the transceivers 418 include any sort of transceivers known in the art. For example, the transceivers 418 may include wired communication components, such as an Ethernet port, for communicating with other networked devices. Also or instead, the transceivers 418 may include wireless modem(s) to may facilitate wireless connectivity with other computing devices. Further, the transceivers 418 may include a radio transceiver that performs the function of transmitting and receiving radio frequency communications via an antenna.

In some implementations, the output devices 420 include any sort of output devices known in the art, such as a display (e.g., a liquid crystal display), speakers, a vibrating mechanism, or a tactile feedback mechanism. Output devices 420 also include ports for one or more peripheral devices, such as headphones, peripheral speakers, or a peripheral display.

In various implementations, input devices 422 include any sort of input devices known in the art. For example, input devices 422 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 5:
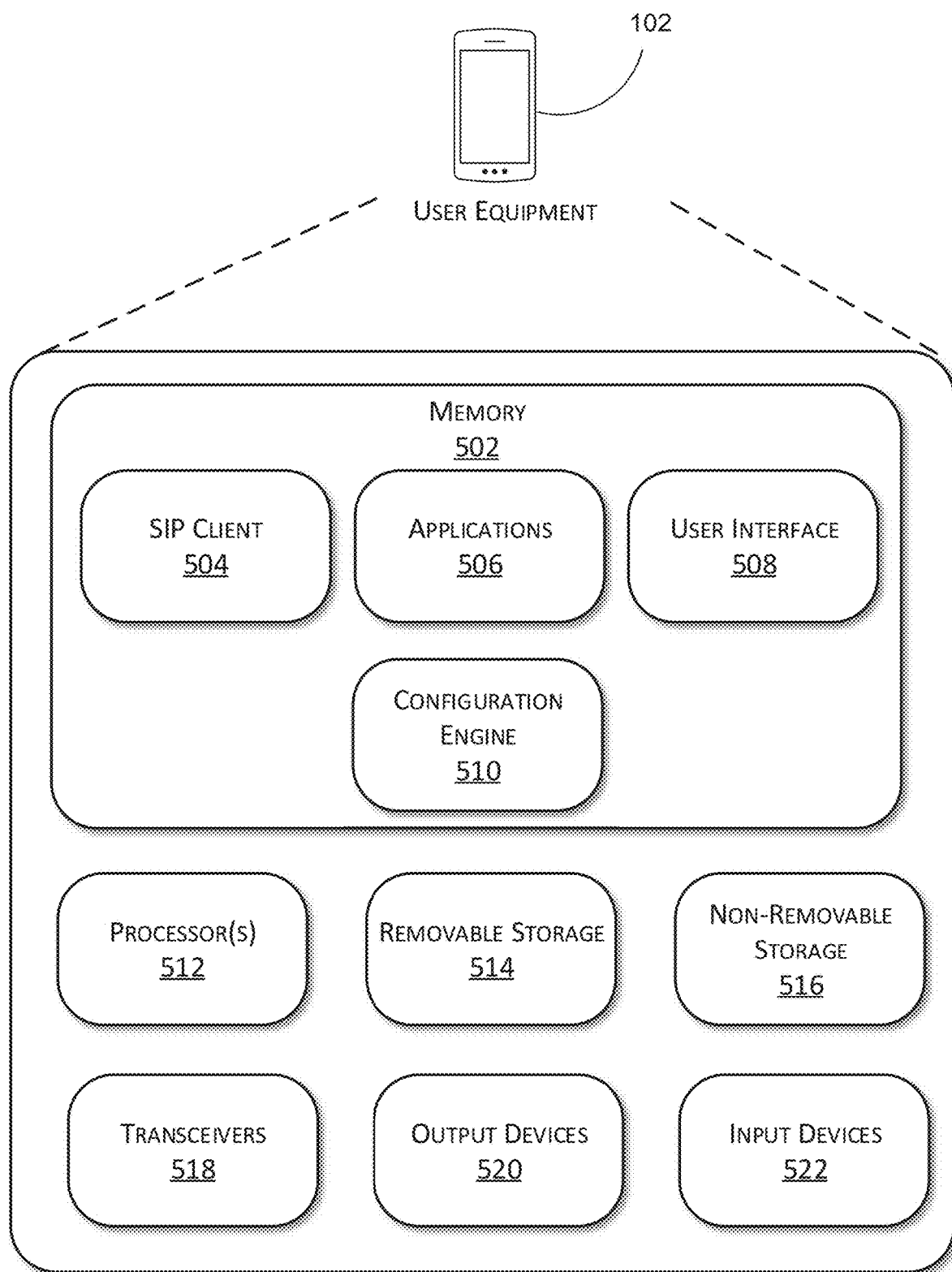
FIG. 5 illustrates a component level view of an example UE for use with the system, in accordance with some examples of the present disclosure.

FIG. 5 illustrates a component level view of an example UE 102 including provisions for receiving an OTA configuration message, as discussed above. As illustrated, the UE 102 can comprise a system memory 502 storing a SIP client 504, application(s) 506, a user interface 508, and a configuration engine 510. Also, the UE 102 includes processor(s) 512, a removable storage 514, a non-removable storage 516, transceivers 518, output device(s) 520, and input device(s) 522.

In various implementations, system memory 502 is volatile (such as RAM), non-volatile (such as ROM, flash memory, etc.), or some combination of the two. The SIP client 504 may perform any or all of the receiving of network identities, contact addresses, and other functions related to identifying the UE 102 to the telecommunication network 104. The application(s) 506 can include various common applications (e.g., navigation, text messaging, web browsers, etc.). The UE 102 can also include a user interface 508, such as a graphical user interface (GUI) configured to receive user input and generate user preferences.

The UE 102 can also comprise a configuration engine 510. As the name implies, the configuration engine 510 can receive, store, and update any type of configuration information that may be associated with the UE 102. Thus, in some examples, the initial configuration can be hardcoded into the UE 102 via the configuration engine 510 during manufacture. In other examples, the configuration engine 510 can retrieve the initial configuration from the telecommunication network 104, for example, when the UE 102 is first powered up.

In some examples, the configuration engine 510 can be responsible for communicating with the OTA platform 120 via the SMSC 128 in order to receive OTA configuration messages and to store and/or update configurations associated with the UE 102. The configuration engine 510 can be implemented as hardware, software, or a combination thereof.

In some examples, the configuration engine 510 can comprise an application running on the UE 102. The configuration engine 510 may run in a secure trusted execution environment (TEE), for example, that is separate from the rich operating system (OS) of the UE 102. In other examples, the configuration engine 510 can be implemented as hardware on the UE 102.

In some implementations, the processor(s) 512 is a central processing unit (CPU), a graphics processing unit (GPU), or both CPU and GPU, or any other sort of processing unit. The UE 102 may also include additional data storage devices (removable and/or non-removable) such as, for example, magnetic disks, optical disks, or tape. Such additional storage is illustrated in FIG. 5 by removable storage 514 and non-removable storage 516.

Non-transitory computer-readable media may include volatile and nonvolatile, removable and non-removable tangible, physical media implemented in technology for storage of information, such as computer readable instructions, data structures, program modules, or other data. System memory 502, removable storage 514, and non-removable storage 516 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the UE 102. Any such non-transitory computer-readable media may be part of the UE 102.

In some implementations, the transceivers 518 include any sort of transceivers known in the art. For example, transceivers 518 may include a radio transceiver that performs the function of transmitting and receiving radio frequency communications via an antenna. The transceivers 518 may facilitate wireless connectivity between the UE 102 and other devices. In addition, the transceivers 518 may also include a wireless communication transceiver and a near field antenna for communicating over unlicensed wireless IP networks, such as local wireless data networks and personal area networks (e.g., Bluetooth or near field communication (NFC) networks). Further, the transceivers 518 may include wired communication components, such as an Ethernet port, that connect the UE 102 in a wired fashion to other devices.

In some implementations, the output devices 520 include any sort of output devices known in the art, such as a display (e.g., a liquid crystal display), speakers, a vibrating mechanism, or a tactile feedback mechanism. Output devices 520 also include ports for one or more peripheral devices, such as headphones, peripheral speakers, or a peripheral display.

In various implementations, input devices 522 include any sort of input devices known in the art. For example, input devices 522 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

FIGS. 6-7 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described should not be construed as a limitation, and any number of the described operations can be combined in any order and/or in parallel to implement the processes.

As shown in FIG. 6, examples of the present disclosure can also comprise a method 600 for generating an OTA configuration message and sending the OTA configuration message to a UE.

For example, at operation 602, a telecommunication network device can receive at least a type allocation code (TAC), an international mobile subscriber (IMSI) range, a type of over the air (OTA) message, and an OTA configuration reference. For example, the OTA server 122 may receive identifying information from an operator accessing a computing device 130 associated with a MNO that specifies the UE 102 or a group of UEs 132. For example, the computing device 130 may be associated with a mobile network operator (MNO) of the telecommunication network 104 and the computing device 130 may present an interface to a user associated with the MNO that enables the user to fill out multiple fields specifying the UEs 102 in which the user would like to send an OTA update. In some cases, the identifying information may include a type allocation code (TAC), an international mobile subscriber range (IMSI) range, a type of over the air (OTA) message (e.g., change in access point name (APN), change in mobile station international subscriber directory number (MSISDN) change in roaming settings, change in security settings etc.), and/or an OTA configuration reference (e.g., OTA_CONFIG_FI_APN, OTA_CONFIG_FI_VM, etc.).

At operation 604, a telecommunication network device can generate, based at least in part on the type of OTA message and the OTA configuration reference, an OTA configuration message. For example, the OTA server 122 may generate an OTA configuration message (e.g., OTA update) based on the identifying information. For example, the computing device 130 may access the OTA policy engine 124 and provide the identifying information specifying the UEs 102, the type of OTA message, and the OTA configuration information. The OTA server 122 may receive a transmission from the OTA policy engine 124 indicating that an OTA update has been requested and the OTA policy engine 124 may provide the identifying information specifying the UEs 102, the type of OTA message, and the OTA configuration information to the OTA server 122. The OTA server 122 may then access the OTA Configuration Server 126 and request a configuration, based on the type of OTA message information received and/or the OTA configuration reference information received, that may be provided to the specified UEs 102 via an OTA configuration message.

At operation 606, a telecommunication network device can determine, via accessing an equipment identity register (EIR) and based at least in part on the TAC and the IMSI range, at least one user equipment (UE) in which to send the OTA configuration message. For example, the OTA server 122 may determine the UEs 102 in which to send the OTA configuration message based on the identifying information. For example, the OTA server 122 may access the EIR 118 in order to determine the UEs 102 that satisfy the specified identifying information received from the computing device 130. In some examples, the OTA server 122 may access the EIR and/or the OTA Policy Engine 124 via an application programming interface (API). In some examples, the UEs 102 may connect to the telecommunication network 104 via the macrocell 110 and may be authenticated by the AMF 112, MME 114, and/or the SGSN 116. The AMF 112, MME 114, and/or the SGSN 116 may communicate with the EIR 118 and provide the EIR 118 with identifying information associated with the UEs 102, such as TACs, IMSIs, IMEIs, and the like. The EIR 118 may store the identifying information associated with the UEs. The EIR 118 may receive the identifying information from the AMF 112, MME 114, and/or the SGSN 116 via 3GPP standard interfaces (e.g., S13, S13', N17, etc.).

At operation 608, a telecommunication network device can send, to the at least one UE, the OTA configuration message. For example, once the UEs 102 are determined and the OTA configuration message is generated, the OTA server 122 may send the OTA configuration message to the UEs 102. In some examples, the OTA server 122 may send the OTA configuration message to the UEs via the SMSC 128.

As shown in FIG. 7, examples of the present disclosure can also comprise a method 700 for generating an OTA configuration message and sending the OTA configuration message to a UE.

For example, at operation 702, a telecommunication network device can receive at least first identifying information associated with at least one user equipment (UE), second identifying information associated with the at least one UE, a first type of over the air (OTA) message, a second type of over the air (OTA) message, a first OTA configuration reference, and a second OTA configuration reference. For example, the OTA server 122 may be configured to send multiple different OTA configuration messages to multiple different SIMs (e.g., a physical SIM and an eSIM), such as SIM 106 and eSIM 108 that are associated with the same UE 102. For example, SIM 106 and eSIM 108 may both be associated with the UE 102 and may each include a unique IMEI. When the OTA server 122 receives the identifying information used to specify the UEs 102 to send the OTA configuration message, the OTA server 122 may also receive IMEI information specifying specific SIMs, such as SIM 106 and eSIM 108 in which to send the OTA configuration message. The OTA server 122 may also receive a different type of OTA message and OTA configuration refence for the SIM 106 then the eSIM 108. In this case, the OTA server 122 would access the OTA configuration server 126 to retrieve a configuration for the SIM 106 and a different configuration for the eSIM 108.

At operation 704, a telecommunication network device can generate, based at least in part on the first type of OTA message and the first OTA configuration reference, a first OTA configuration message. At operation 706, a telecommunication network device can generate, based at least in part on the second type of OTA message and the second OTA configuration reference, a second OTA configuration message. For example, the OTA server 122 may generate an OTA configuration message (e.g., OTA update) based on the identifying information. For example, the computing device 130 may access the OTA policy engine 124 and provide the identifying information specifying the UEs 102, the type of OTA message, and the OTA configuration information. The OTA server 122 may receive a transmission from the OTA policy engine 124 indicating that an OTA update has been requested and the OTA policy engine 124 may provide the identifying information specifying the UEs 102, the type of OTA message, and the OTA configuration information to the OTA server 122. The OTA server 122 may then access the OTA Configuration Server 126 and request a configuration, based on the type of OTA message information received and/or the OTA configuration reference information received, that may be provided to the specified UEs 102 via an OTA configuration message.

At operation 708, a telecommunication network device can determine, via accessing an equipment identity register (EIR) and based at least in part on the first identifying information and the second identifying information a first SIM associated with the at least one UE to receive the first OTA configuration message and a second SIM associated with the at least one UE to receive the second OTA configuration message. For example, the OTA server 122 may determine the UEs 102 in which to send the OTA configuration message based on the identifying information. For example, the OTA server 122 may access the EIR 118 in order to determine the UEs 102 that satisfy the specified identifying information received from the computing device 130. In some examples, the OTA server 122 may access the EIR and/or the OTA Policy Engine 124 via an application programming interface (API). In some examples, the UEs 102 may connect to the telecommunication network 104 via the macrocell 110 and may be authenticated by the AMF 112, MME 114, and/or the SGSN 116. The AMF 112, MME 114, and/or the SGSN 116 may communicate with the EIR 118 and provide the EIR 118 with identifying information associated with the UEs 102, such as TACs, IMSIs, IMEIs, and the like. The EIR 118 may store the identifying information associated with the UEs. The EIR 118 may receive the identifying information from the AMF 112, MME 114, and/or the SGSN 116 via 3GPP standard interfaces (e.g., S13, S13', N17, etc.).

At operation 710, a telecommunication network device can send the first OTA configuration message to the first SIM and the second OTA configuration message to the second SIM. For example, once the UEs 102 are determined and the OTA configuration message is generated, the OTA server 122 may send the OTA configuration message to the UEs 102. In some examples, the OTA server 122 may send the OTA configuration message to the UEs via the SMSC 128.

CONCLUSION

While several possible examples are disclosed above, examples of the present disclosure are not so limited. For instance, while various entries 202-208 on the SIM card 200 are discussed for use with the system, other entries on the SIM card 200 could be used to specify a group of UEs 102 in a similar fashion. In addition, the location and configuration used for various features of examples of the present disclosure such as, for example, the layout of the telecommunication network 104 and the OTA platform 120, for example, can be varied according to a particular network, UE, or location that requires a slight variation due to, for example, size or power constraints, the type of processing required, or regulations related to transmission interference, for example. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A computing device comprising:
   a processor; and
   computer-readable instructions that, when executed by the processor cause the computing device to perform operations comprising:
   receiving at least:
      a type allocation code (TAC);
      an international mobile subscriber range (IMSI) range;
      a type of over the air (OTA) message; and
      an OTA configuration reference;
   generating, based at least in part on the type of OTA message and the OTA configuration reference, an OTA configuration message;
   determining, via accessing an equipment identity register (EIR) and based at least in part on the TAC and the IMSI range, a plurality of UEs that are associated with a same type of data plan, a same type of device, and a same type of operating system to receive the OTA configuration message; and
   sending, to the plurality of UEs, the OTA configuration message.

2. The computing device of claim 1, wherein the OTA configuration message causes the plurality of UEs to perform at least one operation comprising at least one of:
   updating a mobile station international subscriber directory number (MSISDN);
   updating an access point name (APN);
   updating at least one roaming setting; or
   updating at least one security setting.

3. The computing device of claim 1, wherein at least one UE of the plurality of UEs includes a first subscriber identity module (SIM) and a second SIM, the first SIM having a first international mobile equipment identity (IMEI) and the second SIM having a second IMEI that is different than the first IMEI.

4. The computing device of claim 3, the operations further comprising:
   receiving the first IMEI;
   wherein sending the OTA configuration message comprises sending the OTA configuration message to the first SIM of the at least one UE based at least in part on the first IMEI.

5. The computing device of claim 3, wherein the IMSI range is a first IMSI range associated with the first SIM, the type of OTA message is a first type of OTA message associated with the first SIM, the OTA configuration reference is a first type of OTA configuration reference associated with the first SIM, the OTA configuration message is a first OTA configuration message, and the operations further comprise:
   sending a second OTA configuration message to the second SIM based at least in part on at least one of:
      a second IMSI range;
      a second type of OTA;
      a second OTA configuration reference; or
      the second IMEI;
   wherein the first OTA configuration message is different than the second OTA configuration message.

6. The computing device of claim 3, wherein the first SIM and the second SIM include a same TAC.

7. A method comprising:
   receiving at least:
      identifying information that identifies at least one user equipment (UE);
      a type of over the air (OTA) message; and
      an OTA configuration reference;
   generating, based at least in part on the type of OTA message and the OTA configuration reference, an OTA configuration message;
   determining, via accessing an equipment identity register (EIR) and based at least in part on the identifying information, a plurality of UEs that are associated with a same type of data plan, a same type of device, and a same type of operating system to receive the OTA configuration message, the plurality of UEs including the at least one UE; and
   sending, to the plurality of UEs, the OTA configuration message, wherein the OTA configuration message causes the plurality of UEs to perform at least one operation comprising at least one of:
      updating a mobile station international subscriber directory number (MSISDN);
      updating an access point name (APN);
      updating at least one roaming setting; or
      updating at least one security setting.

8. The method of claim 7, wherein the at least one UE includes a first subscriber identity module (SIM) and a second SIM, the first SIM having a first international mobile equipment identity (IMEI) and the second SIM having a second IMEI that is different than the first IMEI.

9. The method of claim 8, further comprising:
   receiving, from the at least one UE, the first IMEI;
   wherein sending the OTA configuration message comprises sending the OTA configuration message to the first SIM of the at least one UE based at least in part on the first IMEI.

10. The method of claim 8, wherein the identifying information includes a first IMSI range associated with the first SIM, the type of OTA message is a first type of OTA message associated with the first SIM, the OTA configuration reference is a first type of OTA configuration reference associated with the first SIM, the OTA configuration message is a first OTA configuration message, and the method further comprises:
   sending a second OTA configuration message to the second SIM based at least in part on at least one of:
      a second IMSI range;
      a second type of OTA;
      a second OTA configuration reference; or
      the second IMEI;
   wherein the first OTA configuration message is different than the second OTA configuration message.

11. The method of claim 8, wherein the first SIM and the second SIM include a same TAC.

12. The method of claim 8, wherein the identifying information comprises at least one of a TAC and an IMSI range.

13. A method comprising:
   receiving at least:
      first identifying information associated with at least one user equipment (UE);
      second identifying information associated with the at least one UE;
      a first type of over the air (OTA) message;
      a second type of over the air (OTA) message;
      a first OTA configuration reference; and
      a second OTA configuration reference;

generating, based at least in part on the first type of OTA and the first OTA configuration reference, a first OTA configuration message;

generating, based at least in part on the second type of OTA and the second OTA configuration reference, a second OTA configuration message;

determining, via accessing an equipment identity register (EIR) and based at least in part on the first identifying information and the second identifying information, a first SIM associated with the at least one UE to receive the first OTA configuration message and a second SIM associated with the at least one UE to receive the second OTA configuration message; and sending the first OTA configuration message to the first SIM and the second OTA configuration message to the second SIM.

14. The method of claim 13, wherein:
the first identifying information includes at least one of:
a first international mobile subscriber range (IMSI) range; or
a first IMEI; and
the second identifying information includes at least one of:
a second IMSI range; or
a second IMEI.

15. The method of claim 13, wherein the first SIM comprises a physical SIM card and the second SIM comprises an eSIM.

16. The method of claim 13, wherein the first SIM and the second SIM include a same TAC.

17. The method of claim 13, wherein at least one of the first OTA configuration message or the second OTA configuration message causes the at least one UE to perform at least one operation comprising at least one of:
updating a mobile station international subscriber directory number (MSISDN);
updating an access point name (APN);
updating at least one roaming setting; or
updating at least one security setting.

* * * * *